United States Patent [19]

Boll

[11] Patent Number: 4,720,801

[45] Date of Patent: Jan. 19, 1988

[54] METHOD AND APPARATUS FOR SETTING A THROUGHPUT QUANTITY CONTROL VALVE OF A PAINT SPRAYGUN

[75] Inventor: Hans-Joachim Boll, Markdorf, Fed. Rep. of Germany

[73] Assignee: J. Wagner GmbH, Fed. Rep. of Germany

[21] Appl. No.: 743,639

[22] Filed: Jun. 11, 1985

[30] Foreign Application Priority Data

Jun. 22, 1984 [DE] Fed. Rep. of Germany ....... 3423094

[51] Int. Cl.[4] ........................ B05B 12/14; G06F 15/46

[52] U.S. Cl. .................................... 364/510; 118/696; 239/69

[58] Field of Search ............... 364/468, 478, 479, 509, 364/510; 239/69, 74, 112, 305; 118/696, 697, 704, 324

[56] References Cited

U.S. PATENT DOCUMENTS

| | | | |
|---|---|---|---|
| 3,674,207 | 7/1972 | Carbonetti, Jr. et al. | 239/69 |
| 3,981,320 | 9/1976 | Wiggins | 239/69 |
| 4,278,046 | 7/1981 | Clarke et al. | 239/69 |
| 4,328,549 | 5/1982 | Avery | 364/476 |
| 4,360,877 | 11/1982 | Langston et al. | 364/510 |
| 4,362,124 | 12/1982 | Fleig | 239/69 |
| 4,392,611 | 6/1983 | Bachman et al. | 364/510 |
| 4,509,684 | 4/1985 | Schoviak | 239/112 |
| 4,553,702 | 11/1985 | Coffee et al. | 239/69 |
| 4,593,360 | 6/1986 | Cocks | 364/468 |

OTHER PUBLICATIONS

European Patent publication No. 166,092, search report published Jan. 2, 1986, based on application No. 85104010.5.

*Primary Examiner*—Jerry Smith

*Assistant Examiner*—Clark A. Jablon

*Attorney, Agent, or Firm*—Hill, Van Santen, Steadman & Simpson

[57] ABSTRACT

The paint throughput quantity of a motor-driven throughput control valve of a paint spraygun is set such that first, a sequence of assignments between throughput quantity values and electric valve motor actuation signals is produced and input into a microcomputer as an approximation table. By selecting the desired value of throughput quantity, the microcomputer is then initialized to supply the tabularly-appertaining actuation signal to the valve motor as a control signal and to therefore approximately set the throughput control valve to the desired reference value. Finally, the throughput quantity is continuously measured during paint flow through the throughput valve and the measured values are supplied to the microcomputer as actual values, the microcomputer then supplying regulating signals to the valve motor on the basis of a comparison between the reference values and the actual values and therefore continuously readjusting the throughput control valve to the reference value.

8 Claims, 2 Drawing Figures

METHOD AND APPARATUS FOR SETTING A THROUGHPUT QUANTITY CONTROL VALVE OF A PAINT SPRAYGUN

BACKGROUND OF THE INVENTION

1. Field of the Invention

The present invention relates to a method and to an apparatus for setting the paint throughput quantity of a motor-driven throughput control valve of a paint spraygun, particularly an automatic paint spraygun having a frequent change of throughput quantity and paint, preferably for assemblyline spraying of automobile bodies.

2. Description of the Prior Art

Given modern paint sprayer devices and systems, mechanical or electrical throughput regulating units which must be manually set are employed for setting the throughput quantity. The respective actual value of the throughput is thereby displayed by an independent measuring device and the operator then carries out a correction on the basis of the value that has been read. In complicated enameling or lacquering operations, for example when enameling automobile bodies, these known methods or, respectively, apparatus for setting the throughput quantity are, however, unsatisfactory. Therefore, for example, an automobile body comprises a plurality of spraying zones, i.e. zones having different intensities of paint application. When, for example, one proceeds on the assumption that the body is conducted through the painting station with an assembly line speed of five meters per minute, then the workpiece already traverses a distance of 8 cm in one second. The lengths of the spraying zones thereby lie between about 30 cm and 100 cm. In order, then, for a change of the throughput quantity for the paint sprayguns of the individual spraying zones to take full effect, the setting of the throughput quantity must occur very quickly, i.e. the transition from the maximum to the minimum throughput quantity should be possible within one section. This, however, is not possible with the known devices because both the actual adjustment times as well as the times for measuring and reading the actual values lie on the order of several seconds. When a change of paint or paint color is to be carried out between two workpieces, then a rinse operation requiring a fully-opened throughput valve must be carried out. Subsequently, the valve must be set to the throughput quantity of the first spraying zone of the following workpiece. Considerable time delays thereby occur precisely when changing paints or colors. Also to be taken into consideration is that the throughput quantity of the respective paint is dependent on the viscosity of the paint and, therefore, on the ambient temperature as well, with the consequence that the setting values change during a production stage. At any rate, the problems lead to the fact that the setting of the required throughput quantities is not only laborious and time-consuming, but also that deviations of 20% and far more must necessarily be accepted.

SUMMARY OF THE INVENTION

It is therefore the object of the present invention to provide a method and an apparatus with whose assistance one succeeds in undertaking an automatic adjustment of the throughput quantity in the shortest possible time and with high accuracy.

According to the invention, a method is provided for setting the quantity of paint throughput of a motor-driven throughput control valve of a paint spraygun, particularly of an automatic paint spraygun having frequent changes of throughput quantities and paints, particularly for assembly line spraying of automobiles, and is characterized in that, first, a sequence of assignments between throughput quantity values and electrical valve motor actuation signals is compiled and input into a microcomputer as an approximation table, in that, then, the microcomputer is initialized by setting the desired throughput quantity value to transmit the tabular appertaining actuation value to the valve motor as a control signal and to thus set the throughput control valve approximately to this reference value, and in that, subsequently, the throughput quantity is continuously measured during the paint flow through the throughput control valve and the measured values are supplied to the microcomputer as actual values, the microcomputer then supplying regulating signals to the valve motor on the basis of a comparison between the reference values and the actual values and thus continuously readjusting the throughput control valve to the rated value.

Also according to the invention, the apparatus comprises a paint spraygun, a paint delivery line connecting the paint spraygun to the paint changing unit, an enabling valve in the paint delivery line and throughput control valve which is actuated by a motor and which is in the paint delivery line. The apparatus is particularly characterized by a throughput meter also in the paint delivery line and by a microcomputer, whereby the microcomputer is connected by way of signal lines to the motor for the throughput control valve, to the throughput meter, to the paint changer and to an input/display device.

In accordance with the invention, therefore, a control is first undertaken and then a regulation. The control serves the purpose of setting the throughput valve to the approximate reference value as quickly as possible, in particular regardless of whether there is a paint flow or not. This approximate setting of the reference value, therefore, can already be executed before the paint flow is enabled. Following this approximate selection of the reference value, a regulation to the exact reference value occurs in the closed-loop control, with paint flow. It is therefore possible to obtain accurate throughput quantities even when the individual spraying operations are extremely short, for example between 0.5 and 1 second. In addition, the invention also does justice to special cases such as, for example, changing paints, paint interruption and the like to a particular degree, as shall be shown in detail in the following description.

BRIEF DESCRIPTION OF THE DRAWINGS

Other objects, features and advantages of the invention will be best understood from the following detailed description, taken in conjunction with the accompanying drawings, on which.

DESCRIPTION OF THE PREFERRED EMBODIMENTS

Figure 1:
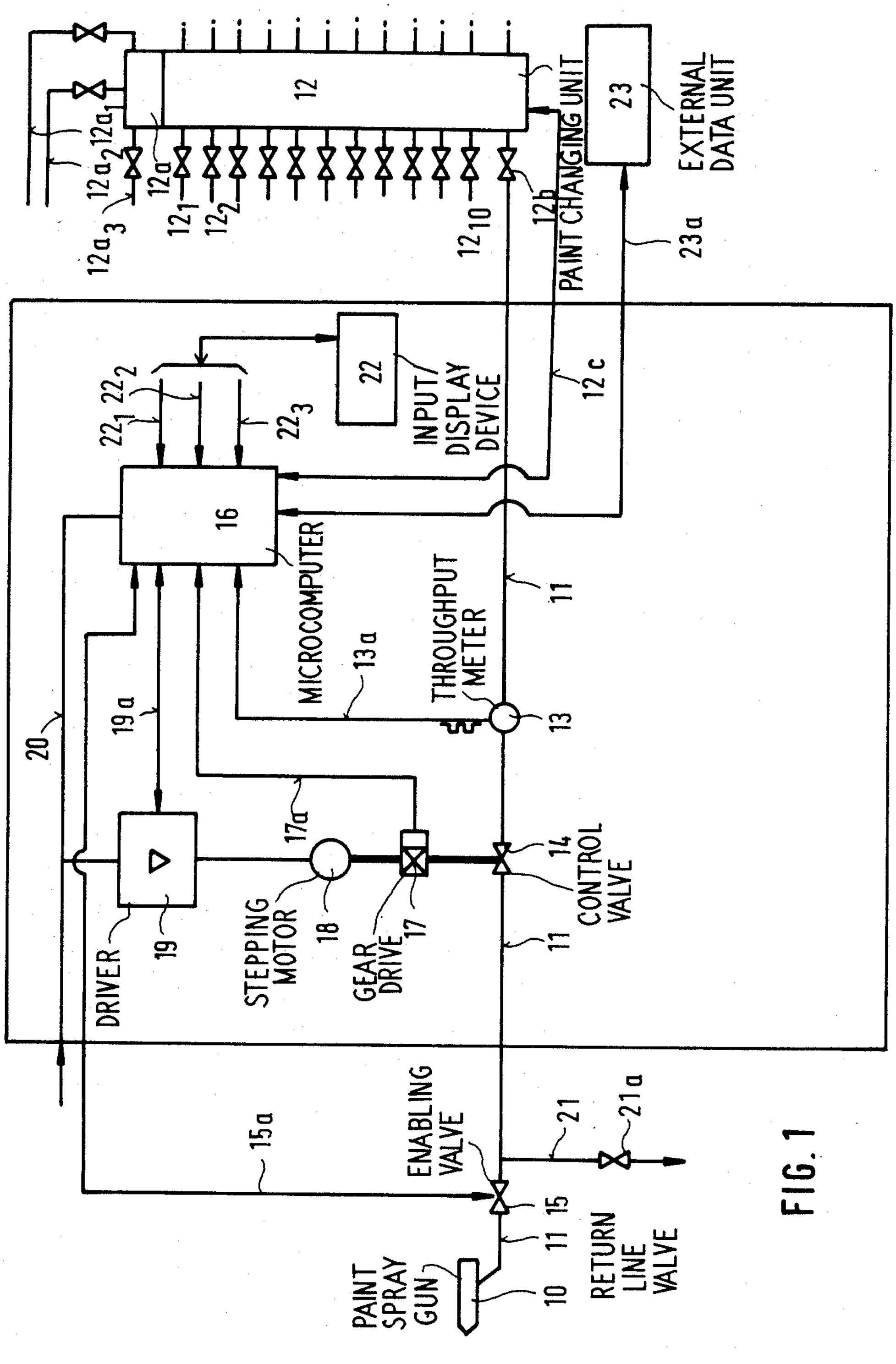
FIG. 1 is a block diagram of the entire spraying apparatus.

Referring to FIG. 1, a paint spraygun 10 is illustrated which is supplied by a paint feeder line 11. The line 11 is, in turn, supplied with paint by a paint changing unit 12 which comprises a series of paint connections 12$_1$—12$_{10}$ for various paint colors, a rinsing group **12*a*** integrated therein with connections $12a_1$, $12a_2$ and $12a_3$ for rinse air, solvent and impelling air and, finally, a discharge valve 12*b* connected to the line 11. Located in the line 11 in the direction from the paint changing unit 12 to the gun 10 are a throughput meter 13, a throughput control valve 14 and an enabling valve 15. The throughput meter 13 transmits its measured signals to a microcomputer 16 by way of a line 13*a*.

The throughput control valve 14 is actuated via a gear drive 17 by a stepping motor 18 which is connected via a driver 19 to a voltage supply line 20 which also serves as the energy source for the microcomputer 16. The gear drive 17 is connected via a record circuit 17*a* to the microcomputer 16 and the driver 19 is connected to the microcomputer 16 by way of a control line 19*a*. The enabling valve 15, preferably a solenoid valve, can be manually actuated, for instance via a reed contact of the spraygun trigger, and can be actuated via a higher-ranking control system, or can be actuated via the connecting line 15*a* extending from the microcomputer 16. A standard return line having a valve 21*a* is referenced 21.

The microcomputer 16 is also connected to an input/-display device 22, in particular by way of a reference value line $22_1$, a paint changing line $22_2$, and an enable line $22_3$. Finally, the microcomputer 16 is connected to the paint changing unit 12 by way of a line 12*c*.

For operation of the system, the operator inputs the desired paint type and a reference value for the throughput into the microcomputer 16 via the input/-display unit 22, with the result that the microcomputer correspondingly sets the paint changing unit 12 and sets the throughput valve 14 to its reference value via the driver 19 and/or via the gear drive 17. When the operator opens the enabling valve 15, for instance by actuating the spray gun trigger or by pressing a corresponding key of the input/display device 22, then a paint flow is produced in the line 11, whereby the throughput meter 13 informs the microcomputer 16 of the actual value of the throughput through the line 11. On the basis of this actual value, the microcomputer 16 regulates the throughput valve 14 to the exact reference value and sees to it that this reference value is accurately maintained. Thereby significant is that a fast control of the throughput valve 14 to the approximate reference value occurs first, whereby this can occur either given an open or a closed enabling valve 15 and that a regulating operation for achieving and maintaining the exact reference value is then executed on the basis of the measurement of the actual throughput values.

Before initial operation, for example in the morning before the beginning of a production run, a throughput quantity table is compiled. This means that the positions of the stepping motor 18 or, respectively, of the gear drive 17 which corresponds to specific opening crosssections of the throughput control valve 14 are defined for every paint for a variety of throughput values. Compiling the table, however, can also occur automatically by the microcomputer, to which end, however, a paint flow (test spraying) is required. When there is a linear dependency, then two data are required for each paint; when the dependency is non-linear, then a plurality of tabular values must be compiled, whereby the plurality thereof depends on the starting accuracy that is required. It has been shown in practice that satisfactory results are achieved when the table error lies below 10%, i.e. the deviation of the reference table value from the actual value does not exceed 10%. The compiled tabular values are then stored in the microcomputer 16. When production is then started, the operator or the higher-ranking control system, as mentioned, then inputs the desired reference value of the throughput quantity and the desired paint into the microcomputer. On the basis of the stored table, the microcomputer then actuates the stepping motor 18 and/or the gear drive 17 and therefore sets the throughput control valve 14 to an appropriate value which corresponds to the throughput quantity near the reference throughput quantity value, for example with the maximum deviation of $\pm 10\%$. When the flow through the line 11 is initiated by the opening of the enabling valve 15, then the throughput meter 13 continuously communicates the actual values of the throughput quantity to the microcomputer 16 and the microcomputer 16 readjusts the valve 14 on the basis of a comparison between the actual value and the reference value until the actual value and the reference value coincide, which can be considered established in practice when the deviation lies below 3%. When a new reference value is input, the microcomputer 16 calculates the new position of the stepping motor on the basis of the stored table and sets the valve 14 to the new appropriate value, times of, at most, 1 second being required for this purpose. Subsequently, the regulating operation is then carried out again until there is coincidence between reference and actual values. As mentioned, the setting of the appropriate value can thereby occur in the quiescent condition (not paint flow) and in the operating condition (paint flow); the regulating operation, understandably, requires the existence of a paint flow.

With respect to the stored table, it must be taken into consideration that the throughput quantity with a given operating crosssection of the valve 14 is dependent on the viscosity of the paint flowing therethrough, whereby the viscosity is, in turn, a function of the temperature. Changes in temperature during the course of the day, therefore, lead to the fact that the table stored, for example, in the morning becomes less accurate. For this reason, it is advantageous to provide the microcomputer with a table correction program which automatically undertakes a correction of the table as a function of a temperature sensor or as a function of deviations of the appropriate values from the actual values measured by the flow meter 13 during operation.

Given a paint change, the throughput control valve 14 is fully opened in order to keep the paint changing time as short as possible. During the paint change, in particular, a rinsing of the line with solvent and rinse air is carried out. It would thereby not be meaningful to undertake throughput measurements and/or regulating because the only significance is that the rinsing operation can be quickly executed. After the rinsing operation, the valve 14 is set to the newly-selected reference value or, respectively, returns to the reference value prevailing before the paint change.

Figure 2:
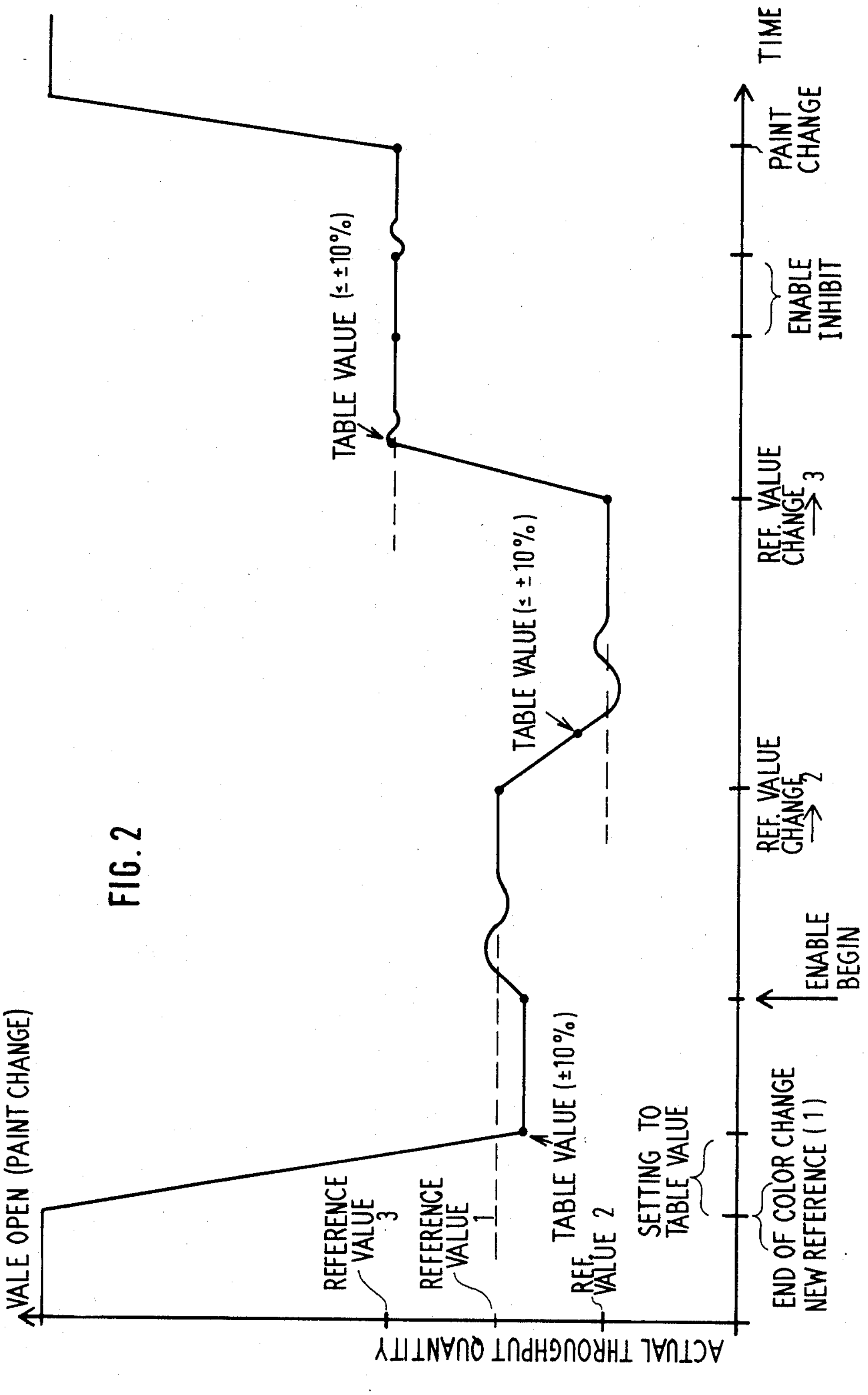
FIG. 2 is a diagram for explaining the control and regulation operation.

FIG. 2 illustrates a typical example of the control and regulation operation of the present invention. The throughput quantity is indicated on the ordinate and the time lapse is indicated on the abscissa. The operation therefore begins with a paint change (full throughput for the rinse agent) and ends with a color change, whereby three different reference values 1, 2 and 3 are provided between these paint changes. In every change of reference value, the valve 14 is first set to the appropriate value (table value), whereupon the regulation on the basis of the measured actual values then occurs. It has thereby been assumed in the illustrated example that the appropriate setting to the first reference value occurs without paint flow (enabling value 15 closed) but occurs given flowing paint (enabling valve 15 opened) in the other reference values. In practice, the operation corresponds to spraying an automobile body which is conducted past the spraying station on the assembly line and has three zones of differing intensity of paint application.

Both the apparatus and the method can be subjected to modification without departing from the scope of the invention. A very cost-effective valve construction is composed, for example, of a needle valve and a stepping motor. The needle valve comprises a spindle drive. The needle valve is directly connectible to the drive shaft of the stepping motor via a coupling. The gearing is therefore eliminated and, moreover, an extremely high resolution of, for example, 1:5000 is obtained. In case of a malfunction in the control system, this valve arrangement comprised of a spindle-driven needle valve and a stepping motor has very good emergency running properties, since, on the one hand, the stepping motor and, therefore, the valve remain in position and, on the other hand, can be mechanically adjusted via a handwheel that is secured to the stepping motor shaft. The possible modifications of the method relate particularly to a connection of a microcomputer to a higher-ranking system, for instance a large-scale computer. It therefore becomes possible, for example, to introduce a data exchange between the workpiece conveyor and the spraying system such that all eventualities of the workpiece delivery are communicated to the spraying system and the latter then functions fully automatically.

The present invention can also be employed in all types of paint spraying apparatus, i.e. in both spin nebulizers and in high-pressure nebulizers and in compressed air nebulizers, whereby a corresponding pressure flow control of the compressed air is also conceivable in the latter instance.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of setting a quantity of paint throughput of a motor-driven throughput control value of a paint spraygun, comprising the steps of:

- storing a plurality of throughput quantity values as an approximation table representing electrical valve motor acutation signals;
- selecting a desired throughput quantity value and applying a corresponding electrical valve motor actuation signal to the motor-driven throughput control valve to set the same approximately as a reference value;
- continuously measuring the throughput quantity and producing corresponding actual values;
- comparing the reference and actual values and continuously readjusting the motor-driven throughput control valve to the reference value by selectively applying the electrical valve motor actuation signals, representing the stored throughput quantity value, to the motor-driven throughput control valve; and
- repeating the steps of selecting, continuously measuring and producing corresponding actual values, comparing the reference and actual values and continuously readjusting the motor-driven throughput control valve in response to each selection of a desired throughput quantity value.

2. The method of claim 1, and further comprising the step of:

- after comparing the reference and actual values, limiting any deviation of the actual values from the reference values to approximately 10% initially and to about 3% during regulation.

3. Apparatus for setting a quantity of paint throughput of a paint spraying system which has frequent changes of throughput quantities and paints, comprising:

- a paint spraygun, a paint changing unit and a paint delivery line connecting said paint spraygun to said paint changing unit, said paint changing unit comprising means for delivering a plurality of different paints;
- an enabling valve and a throughput control valve in said paint delivery line;
- motor means connected to said throughput control valve and operable to set the quantity of paint flowing through said throughput control valve;
- a throughput meter in said paint delivery line operable to produce first electrical signals representing actual paint throughput; and
- control means connected to said throughput meter and to said motor means, said control means comprising memory means storing an approximation table of throughput values for the different paints, comparison means for comparing the values represented by said first electrical signals with a corresponding reference value, said control means operable to produce second electrical signals to operate said motor means to adjust said throughput control valve to the corresponding reference value.

4. The apparatus of claim 3, wherein:

- said motor means comprises a motor and a gear drive connecting said motor to said throughput control valve.

5. The apparatus of claim 4, wherein:

- said motor is a stepping motor; and
- said gear means comprises a gear meter.

6. The apparatus of claim 3, wherein said control means is a microcomputer, and further comprises an input/display device for selecting throughput quantity and displaying operating results.

7. The apparatus of claim 6, and further comprising:

- an external data generator connected to said microcomputer as a common control for a plurality of such microcomputers.

8. The apparatus of claim 3, wherein:

- given interruptions in spraying, said control means comprises means for maintaining said throughput control valve in its last position.

* * * * *